(12) United States Patent
Antoine et al.

(10) Patent No.: US 7,662,225 B2
(45) Date of Patent: Feb. 16, 2010

(54) AQUEOUS BITUMEN EMULSION

(75) Inventors: Jean-Pierre Antoine, Francheville (FR); Jerome Marcilloux, Saint Symphorien d'Ozon (FR); Daniel Plusquellec, Noyal Chatillon sur Seiche (FR); Thierry Benvegnu, Rennes (FR); Fabrice Goursaud, Esvres sur Indre (FR)

(73) Assignee: Eiffage Travaux Publics, Neuilly sur Marne (FR)

( * ) Notice: Subject to any disclaimer, the term of this patent is extended or adjusted under 35 U.S.C. 154(b) by 464 days.

(21) Appl. No.: 11/579,509

(22) PCT Filed: May 3, 2005

(86) PCT No.: PCT/FR2005/001104
§ 371 (c)(1),
(2), (4) Date: Jan. 3, 2007

(87) PCT Pub. No.: WO2005/121252
PCT Pub. Date: Dec. 22, 2005

(65) Prior Publication Data
US 2007/0243321 A1    Oct. 18, 2007

(30) Foreign Application Priority Data
May 4, 2004    (FR) .................................. 04 04758

(51) Int. Cl.
*C08L 95/00* (2006.01)
(52) U.S. Cl. ........................................ 106/277; 516/43
(58) Field of Classification Search ................ 106/277; 516/43
See application file for complete search history.

(56) References Cited

U.S. PATENT DOCUMENTS

| | | | | |
|---|---|---|---|---|
| 3,422,026 A | | 1/1969 | Wright ........................ 106/277 |
| 5,721,296 A | * | 2/1998 | Mizunuma et al. ............. 524/60 |
| 5,961,999 A | * | 10/1999 | Bimczok et al. ............. 424/401 |
| 6,013,681 A | * | 1/2000 | Asamori et al. ................ 516/43 |
| 2007/0197420 A1 | * | 8/2007 | Antoine et al. .............. 510/499 |
| 2008/0069638 A1 | * | 3/2008 | Crews et al. ................. 106/277 |
| 2008/0194738 A1 | * | 8/2008 | Crews et al. ................. 106/277 |

FOREIGN PATENT DOCUMENTS

EP    0 750 904    1/1997

* cited by examiner

*Primary Examiner*—Helene Klemanski
(74) *Attorney, Agent, or Firm*—Oblon, Spivak, McClelland, Maier & Neustadt, L.L.P.

(57) ABSTRACT

The invention relates to an aqueous bitumen emulsion, comprising bitumen and a surfactant agent, made from esters or amides of glycine betaine, produced by reaction of glycine betaine with a sulphonic acid and an alcohol or amine with a fatty chain derived from vegetable oils. Said bitumen emulsion may be used in the production of road surfaces.

18 Claims, 1 Drawing Sheet

Study of stability of octadecyl betaine mesylate

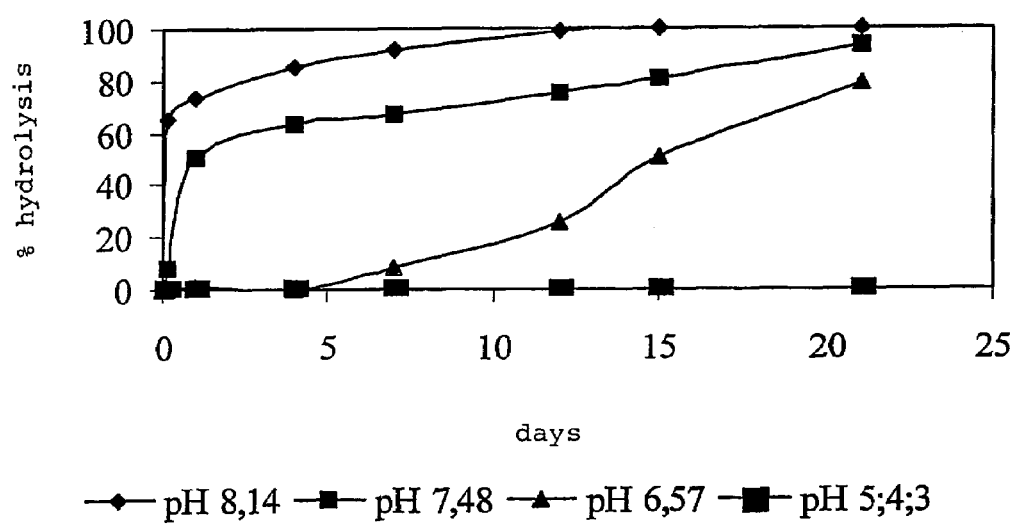
Study of stability of octadecyl betaine mesylate
→ pH 8,14　→ pH 7,48　→ pH 6,57　→ pH 5;4;3

AQUEOUS BITUMEN EMULSION

The invention relates to aqueous bitumen emulsions.

The use of aqueous bitumen emulsions for the support or manufacture of road surfaces has been known from the start of the twentieth century.

These technologies allow for the use of bitumen at a temperature known as "cold", i.e. below a temperature of 100° C. which would bring about evaporation of the aqueous phase.

At the current time, the surfactant agents used for manufacturing these emulsions are of the anionic, cationic, amphoteric or non-ionic type.

According to the aggregates used to form the road surface and the degree of stress thereon, the most appropriate surfactant agent is selected.

In Europe, and more particularly in France, the use of cationic emulsifiers with a pH of less than 7 is very well developed, as these emulsifiers make possible good interaction with the majority of aggregates available.

Furthermore, more than 70% of the emulsions manufactured are used in spreading in the techniques of applying a bonding coating or layer.

However, the techniques of coating with an emulsion base, which form 30% of production, are developing. Although techniques such as emulsion gravels and cold-cast coated materials are used industrially, the development of cold bitumen concretes, or more generally those with an emulsion, is starting to become important.

In all cases, a controlled rupture of the emulsion after application is desirable in order to control the evolution of the properties of the coating.

Thus, in the case of surface coatings, the desirable properties of the emulsion are rapid rupture of the emulsion after spreading and the formation of a homogeneous film of bitumen capable of bonding the aggregates virtually irreversibly.

It is important to note that the rupture of the emulsion must not take place until spreading, and not at the time of manufacture, storage or transport.

As far as emulsion-coated materials are concerned, this must remain stable during storage, from pumping and then mixing with the aggregates. Rupture must therefore be produced progressively in order to allow the application of the coated product whilst ensuring the immediate viability of the road surface. This will be used by traffic in fact in most cases just after manufacture.

In order to obtain these compromises, the molecules of surfactants most widely used are polyamines, amidoamines or imidazolines.

Currently, a strong majority of the surfactants proposed are obtained from the reaction of a polyamine on a fatty acid derivative.

In all cases, the polyamines are a product of the petrochemical industry, whereas in the majority of cases, the fatty acids are of animal origin. Some suppliers have developed molecules whose fatty chain comes from oleaginous vegetables (colza, sunflower, soya, flax, coconut, palm etc.), but the aminated polar head comes from the petrochemical industry.

The only attempts at 100%-vegetable surfactants have been carried out by forming an ester from a fatty acid and from one or two glucose patterns currently called APG (alkyl polyglucosides). But these molecules, when used with bitumen, do not make it possible to obtain a stable emulsion.

However, the use of molecules of vegetable origin presents a certain number of advantages resulting from the use of renewable materials, contributing to the reduction of the greenhouse effect and also having greater biodegradability.

Examination of the safety data files of surfactants such as described above shows a very high level of toxicity towards the environment.

The main object of the invention is to avoid these environmental drawbacks by proposing surfactant agents which are entirely of vegetable origin.

Unlike alkyl polyglucosides (APG) whose efficiency is low, surfactants using betaine glycine as a polar head have proved their good capacity for emulsifying bitumen.

Betaine glycine is a by-product of the sugar industry which is derived from sugar-beet. The fatty chain of the surfactant is derived from triglycerides forming vegetable oils. These triglycerides can be transesterified in order to obtain a fatty ester, itself capable of being converted into fatty alcohol or fatty amine which will react with the carboxylic function of the betaine glycine.

The surfactant so obtained is of the cationic type, the counter-ion originating from the acid necessary for synthesis.

In order vary the stability of the emulsion to variations of pH-value possible at the surface of the aggregates, esters or amides of the betaine glycine can be used within the scope of the invention. Since the ester can hydrolyse at a pH higher than or equal to 7, the amide itself may be preferred.

However, for ease of handling, the origin of vegetable oil may be selected. The content of non-saturated molecules is in fact directly linked to the solid or liquid property of the final product.

The biodegradable fatty chains obtained from colza, soya, sunflower or flax can be advantageously retained, the surfactants usually being liquid or in the form of a paste.

Used in proportions identical to those of the surfactants of the prior art, these molecules lead to stable emulsions. The emulsions obtained with these surfactants have good adhesion to aggregates, which makes them particularly advantageous as aqueous bitumen emulsions, in particular for road works.

BRIEF DESCRIPTION OF THE DRAWING

The FIGURE discloses the study of stability of octadecyl betaine mesylate.

DETAILED DESCRIPTION OF THE PREFERRED EMBODIMENTS

The invention relates more particularly to an aqueous bitumen emulsion containing bitumen and a surfactant agent, in which the surfactant agent comprises at least one compound of formula (1)

$$X^-(CH_3)_3N^+—CH_2—CO\text{-}Z\text{-}R \quad (1)$$ 

X being a sulphonate radical,

R being a monovalent radical of formula $C_{2n}H_{2(2n-m)+1}$ containing 2n atoms of carbon and m double bonds, with $9 \leq n \leq 11$, $0 \leq m \leq 3$ if $n=9$ and $0 \leq m \leq 1$ if $n>9$, and Z being selected from an atom of oxygen and a —NH— group.

Preferably, the surfactant agent comprises at least one compound selected from those with formulae (2), (3) and (4)

$$RZH \quad (2)$$ 

$$XH \quad (3)$$ 

$$X^-(CH_3)_3N^+—CH_2—CO—OH \quad (4)$$ 

a compound of formula XH being combined if necessary with at least one compound of formula $RNH_2$ in order to form at least one compound of formula $X^-RN^+H_3$.

Advantageously, the surfactant agent according to the invention comprises virtually exclusively compounds of the said formulae (1), (2), (3) and (4).

Optional additional or alternative features of the invention are indicated below:

m=0 and the compounds forming the surfactant agent are as follows, in the percentages by weight indicated:

| | |
|---|---|
| $X^-(CH_3)_3N^+$—$CH_2$—CO—O—R | 50 ± 10 |
| ROH | 19 ± 10 |
| XH | 23 ± 10 |
| $X^-(CH_3)_3N^+$—$CH_2$—CO—OH | 0 to 18. | m=0 and the compounds forming the surfactant agent are the following, in the percentages by weight indicated:

| | |
|---|---|
| $X^-(CH_3)_3N^+$—$CH_2$—CO—O—R | 72 ± 10 |
| ROH | 0 to 20 |
| XH | 0 to 18 |
| $X^-(CH_3)_3N^+$—$CH_2$—CO—OH | 0 to 20 | m=0 and the compounds forming the surfactant agent are the following, in the percentages by weight indicated:

| | |
|---|---|
| $X^-(CH_3)_3N^+$—$CH_2$—CO—O—R | 80 ± 10 |
| ROH | 20 ± 10. | m=0 and the compounds forming the surfactant agent are the following, in the percentages by weight indicated:

| | |
|---|---|
| $X^-(CH_3)_3N^+$—$CH_2$—CO—O—R | 70 ± 10 |
| ROH | 26 ± 10 |
| XH | 0 to 14. | m>0 and the compounds forming the surfactant agent are the following, in the percentages by weight indicated:

| | |
|---|---|
| $X^-(CH_3)_3N^+$—$CH_2$—CO—O—R | 48 ± 10 |
| ROH | 36 ± 10 |
| XH | 14 ± 10 |
| $X^-(CH_3)_3N^+$—$CH_2$—CO—OH | 0 to 12. | m=0 and the compounds forming the surfactant agent are the following, in the percentages by weight indicated:

| | |
|---|---|
| $X^-(CH_3)_3N^+$—$CH_2$—CO—NH—R | 58 ± 10 |
| $X^-RN^+H_3$ | 35 ± 10 |
| $X^-(CH_3)_3N^+$—$CH_2$—CO—OH | 0 to 20. | m>0 and the compounds forming the surfactant agent are the following, in the percentages by weight indicated:

| | |
|---|---|
| $X^-(CH_3)_3N^+$—$CH_2$—CO—NH—R | 56 ± 10 |
| $X^-RN^+H_3$ | 31 ± 10 |
| $RNH_2$ | 0 to 18 |
| $X^-(CH_3)_3N^+$—$CH_2$—CO—OH | 0 to 15. |

X is selected from the radicals methanesulphonate, para-toluenesulphonate and camphorsulphonate.

the emulsion further comprises an acid, in particular hydrochloric acid in a proportion of less than 0.25% by weight.

the emulsion further comprises a water-soluble polymer, in particular polyvinyl alcohol, in a proportion of 0.1 to 2% by weight of the emulsion.

Another aspect of the invention relates to the use of an emulsion as defined above in order to make surface coatings, bonding layers, impregnation layers, dense coated materials, semi-dense coated materials which are cold-cast or storable.

A first type of surfactant agents contained in the emulsion according to the invention has a base of fatty esters of the betaine glycine.

The method of preparing these mixtures consists in reacting the betaine glycine with 2 to 3 molar equivalents of a sulphonic acid and 1 to 1.5 molar equivalent of a saturated fatty alcohol of the type $C_{18:0}$, $C_{20:0}$ or $C_{22:0}$ or of a non-saturated fatty alcohol of the type $C_{18:1}$, $C_{18:2}$, $C_{18:3}$, $C_{20:1}$ or $C_{22:1}$, the numbers before and after the sign ":" representing respectively the number of carbon-carbon bonds. The esterification reaction of the betaine glycine in the zwitterionic form requires previous protonation of its carboxylate function. The acid of the betaine reacts with the fatty alcohol in the presence of the excess of acid in order to lead to the corresponding esters. This reaction is carried out in the absence of any solvent, the fatty alcohol used forming both the reagent and the medium.

Preferably, the reaction is carried out at a temperature of between 130 and 140° C. for 6 to 8 hours. The water formed during the reaction is eliminated continuously under reduced pressure, preferably of between 50 and 100 mbar.

The reactional raw materials resulting from carrying out of the method described make it possible to obtain mixtures formed of fatty ester of the betaine glycine, residual fatty alcohol, residual sulphonic acid and residual betaine glycine present in the protonated form, these constituents having the coefficients a, b, c and d respectively, the values of which can be determined by spectroscopy of RMN $^1$H.

When a saturated fatty alcohol is used in the reaction, rapid partial purification based on the difference of solubility between the fatty alcohol and the synthesised ester consists in the recovery of the reactional raw material by means of organic solvents such as diethyl ether, ethanol or n-butanol at the end of the reaction. The ester, insoluble in solvents such as diethyl ether or ethanol or partially soluble in butanol, precipitates and the fatty alcohol partially dissolves. By filtration, powders are obtained which are mainly formed of ester whose composition by mass may be determined by spectroscopy of RMN $^1$H.

According to the organic solvent used to wash the reactional raw materials, the coefficients a, b, c and d vary. The use of alcohols with short carbon chains makes it possible to obtain mixtures where the coefficients c and d are roughly equal to zero, the use of diethyl ether makes it possible to obtain mixtures having a low residual rate of saturated fatty alcohol (b). The excellent solubility of non-saturated fatty alcohols and of their corresponding esters in organic solvents does not make it possible to apply the method described, and the only ones that can be obtained are mixtures in the form of reactional raw materials.

It is possible to purify the fatty esters of betaine glycine by chromatography of the mixtures according to the invention on a column of silica gel by means of ternary polar eluants of the type ethyl acetate/isopropanol/water.

The fatty esters of betaine glycine have a hydrolysable function between the fatty chain and the quaternary ammonium. The study of their behaviour in an aqueous medium makes it possible to contribute an important fact concerning their biodegradability. The stability of the derivatives is tested by chromatography in a gaseous phase by metering the fatty alcohol produced during the hydrolysis reaction in an aqueous buffer solution whose pH-value is fixed at different values.

The measurement of the surface tensions and critical micellar concentrations proves that the synthesised derivatives have amphiphilic properties which make it possible to use the mixtures proposed as surfactant agents (in particular as emulsifiers).

The other family of mixtures according to the invention has a base of fatty amide of betaine glycine.

The method of preparing these mixtures in the first instance uses the reaction of the betaine glycine with 1 to 1.3 molar equivalent of a sulphonic acid and 2 to 4 molar equivalents of n-butanol forming both the reagent and the medium in order to form the n-butyl ester in the form of intermediate sulphonate. Preferably, the first stage is carried out at a temperature of between 130 and 140° C., at the reflux of the n-butanol, for 3 to 5 hours and at atmospheric pressure. The slow distillation of the n-butanol makes it possible to eliminate azeotropically the water formed during the reaction. To the mixture cooled to ambient temperature is then added 1 to 1.2 molar equivalent of a saturated fatty amine of the type $C_{18:0}$, $C_{20:0}$ or $C_{22:0}$ or of a non-saturated fatty amine of the type $C_{18:1}$, $C_{18:2}$, $C_{18:3}$, $C_{20:1}$ or $C_{22:1}$. The reactional medium is heated under reduced pressure to eliminate the n-butanol and aminolysis is carried out for 2 to 4 hours at 130° C. between 50 and 100 mbar.

The formation of the salt of fatty amine resulting from the protonation of the amine by the excess of acid can be limited by the use of 0.1 to 0.4 molar equivalent of a strong, encumbered organic base such as dibutylamine added before the fatty amine.

The reactional raw materials resulting from carrying out the method described make it possible to obtain mixtures formed of fatty amide of betaine glycine, sulphonate of the fatty amine used during aminolysis, a low residue of fatty acid and of residual betaine glycine present in a protonated form, these constituents having coefficients e, f, g and h respectively, the values of which can be determined by spectroscopy of RMN $^1$H.

When a saturated fatty amine is used in the reaction, rapid partial purification based on the difference of solubility between the fatty amine and the synthesised amide consists in the recovery of the reactional raw material by means of diethyl ether at the end of the reaction. The amide and the salt of the fatty amine which are insoluble in the solvent precipitate and the fatty amine dissolves. By filtration, powders are obtained which are mainly formed of amide whose composition by mass can be determined by spectroscopy of RMN $^1$H. The use of diethyl ether makes it possible to obtain mixtures having a residual proportion of saturated fatty amine (g) roughly equal to zero. The recovery of the reactional raw materials by means of alcohols with short carbon chains such as ethanol or n-butanol leads to dissolving of the residues.

The excellent solubility of non-saturated fatty amines and of the corresponding amides in organic solvents does not make it possible to apply the method described and the only ones obtainable are mixtures in the form of reactional raw materials.

The fatty amides of the betaine glycine can be purified by chromatography of the mixtures according to the invention on a column of silica gel by means of ternary polar eluants of the type ethyl acetate/isopropanol/water.

The measurement of the surface tensions and critical micellar concentrations proves that the synthesised amide derivatives also have amphiphilic properties which make it possible to use the mixtures proposed as surfactant agents (in particular as emulsifiers).

The ester and amide derivatives of the betaine glycine have good surfactant properties with surface tensions and critical micellar concentrations which are relatively low. These derivatives according to the invention have surface tensions of the same order as the reference surfactants such as alkyl polyglucosides mentioned above. Compared to these commercial derivatives, critical micellar concentrations are obtained which are lower, which has a major advantage. In fact, less product is needed to obtain micellar solutions.

In the presence of water, these derivatives hydrate to varying degrees according to the condensation of carbon in the chains. They thus make it possible to homogenise a water-oil mixture by acting on the interactions which are both hydrophilic (surfactant/water) and lipophilic (surfactant/oil). They allow the formulation of very stable emulsions, including for low concentrations of surfactant, for variable water/surfactant/oil ratios and for different types of oil (in particular fatty acid methyl esters).

These single-chain surfactants are found to be very advantageous in aqueous bitumen emulsions.

The invention is further illustrated by the following examples.

EXAMPLE 1

Synthesis of octadecyl betaine mesylate and Preparation of the Corresponding Mixtures To a suspension of betaine glycine (25 g, 0.213 mole) in methanesulphonic acid (53.3. g, 0.555 mole) is added octadecanol (69.3 g, 0.256 mole). The mixture thus obtained is heated progressively to 130° C. under reduced pressure (50 to 60 mbar) to eliminate the water formed during the esterification reaction. The mixture becomes homogeneous at the end of 1 to 2 hours' stirring at the same temperature. After 7 hours, the medium is cooled to ambient temperature.

Method A: The reactional raw material obtained (143 g) forms a first composition according to the invention.

Method B: The reactional raw material obtained is washed with diethyl ether (600 ml) until complete recovery of the residue. The precipitate obtained is then filtered on Büchner and rinsed several times with the same solvent (2 □.200 ml). The product is dried in a vacuum and 96 g of a white powder is eventually obtained.

Method C: The reactional raw material obtained is washed with ethanol (800 ml) until complete recovery of the residue. The precipitate obtained is then filtered on Buchner and rinsed several times with the same solvent (2 □.200 ml). The product is dried in a vacuum and 87 g of a white powder is eventually obtained.

Method D: The reactional raw material obtained is washed with n-butanol (900 ml) until complete recovery of the residue. The precipitate obtained is then filtered on Büchner and rinsed several times with the same solvent (2 □.200 ml). The product is dried in a vacuum and 42 g of a slightly grey powder is eventually obtained.

The composition of each mixture is evaluated by RMN of the proton by measuring the integration ratios between the different components. The RMN spectra are recorded on a Bruker ARX-400 apparatus. The RMN $^1$H spectra are obtained at 400 MHz (s=singlet, d=doublet, t=triplet, m=multiplet, l=wide). The RMN $^{13}$C spectra are obtained at 100 MHz in the decoupling mode of the proton. The chemical displacements are given in ppm relative to internal TMS (δ scale) and the coupling constants (J) in Hz.

RMN $^1$H of the reactional raw material (CDCl$_3$+CD$_3$OD, 1/1): δ 0.84 (t, CH$_3$ ester+CH$_3$ alcohol, $^3$J 6.7 Hz), 1.22 (sl, (CH$_2$)$_{15}$CH$_3$ ester+(CH$_2$)$_{15}$CH$_3$ alcohol), 1.51 (m, CH$_2$CH$_2$O alcohol), 1.65 (m, CH$_2$CH$_2$O ester), 2.73 (s, CH$_3$SO$_3^-$ ester+CH$_3$SO$_3^-$ $^{acid+CH}$$_3$SO$_3^-$ betaine glycine), 3.29 (s, (CH$_3$)$_3$ ester+(CH$_3$)$_3$ betaine glycine), 3.51 (t, CH$_2$CH$_2$O alcohol, $^3$J 6.7 Hz), 4.20 (t, CH$_2$CH$_2$O ester, $^3$J 6.8 Hz), 4.25 (s, CH$_2$CO betaine glycine), 4.33 (s, CH$_2$CO ester).

| Method of treatment | Composition of the mixtures | | | |
|---|---|---|---|---|
| | a | b | c | d |
| A | 50 | 19 | 23 | 8 |
| B | 72 | 10 | 8 | 10 |
| C | 80 | 20 | 0 | 0 |
| D | 70 | 26 | 4 | 0 | a, b, c and d are expressed as a percentage by mass.

The reactional raw material or the product obtained by the method of treatment B is chromatographed on a column of silica gel (ethyl acetate-isopropanol-water (6.2:3:0.8)) in order to give about 70 g of octadecyl betaine mesylate.

CH$_3$SO$_3^\ominus$ (CH$_3$)$_3$N$^\oplus$—\—O—\—CH$_3$
          ||
          O         s C$_{24}$H$_{51}$NO$_5$S; M=465.74 g/mole
White solid; yield: ≅70%
CCM: Rf 0.39 (ethyl acetate-isopropanol-water (6:3:1))
IR (Nujol) ν (cm$^{-1}$): 1755 (C=O)
RMN $^1$H(CDCl$_3$+CD$_3$OD, 1/1):
δ 0.83 (t, 3H, CH$_3$, $^3$J 6/7 Hz), 1.22 (sl, 30H, (CH$_2$)$_{15}$CH$_3$), 1.65 (m, 2H, CH$_2$CH$_2$O), 2.70 (s, 3H, CH$_3$SO$_3^-$), 3.29 (s, 9H, (CH$_3$)$_3$), 4.20 (t, 2H, CH$_2$CH$_2$O, $^3$J 6.7 Hz), 4.34 (s, 2H, CH$_2$CO).
RMN $^{13}$C(CDCl$_3$+CD$_3$OD, 1/1):
δ 14.33 (CH$_3$), 23.17, 26.22, 28.82, 29.71, 29.88, 30.02, 30.08, 30.19, 32.45 (CH$_2$ aliph.), 39.50 (CH$_3$SO$_3^-$), 54.18 ((CH$_3$)$_3$), 63.46 (CH$_2$CH$_2$O), 67.27 (CH$_2$CO) 165.24 (CH$_2$CO).

EXAMPLE 2

Synthesis of 9-octadecenyl betaine mesylate and Preparation of the Corresponding Mixture To a suspension of betaine glycine (30 g, 0.256 mole) in methanesulphonic acid (61.523 g, 0.64 mole) is added oleic alcohol (96.25 g, 0.359 mole). The mixture thus obtained is heated progressively to 130° C. under reduced pressure (50 to 100 mbar) in order to eliminate the water formed during the esterification reaction. The mixture becomes homogeneous at the end of 1 to 2 hours' stirring at the same temperature. After 7 hours, the medium is cooled to ambient temperature. The reactional raw material obtained (210 g) forms a composition according to the invention.

RMN $^1$H of the reactional raw material (CDCL$_3$):
δ 0.83 (t, CH$_3$ ester+CH$_3$ alcohol, $^3$J 6.8 Hz), 1.22 (sl, CH$_3$(CH$_2$)$_6$CH$_2$CH=CHCH$_2$(CH$_2$)$_5$CH$_2$CH$_2$O ester+alcohol), 1.50 (m, CH$_2$CH$_2$O alcohol), 1.64 (m, CH$_2$CH$_2$O ester) 1.94 (m, CH$_2$CH=CHCH$_2$ ester+CH$_2$CH=CHCH$_2$ alcohol), 2.74 (s, CH$_3$SO$_3^-$ ester+CH$_3$SO$_3^-$ acid+CH$_3$SO$_3^-$ betaine glycine), 3.30 (s, (CH$_3$)$_3$ ester+(CH$_3$)$_3$ betaine glycine), 3.51 (t, CH$_2$CH$_2$O alcohol, $^3$J 6.7 Hz), 4.19 (t, CH$_2$CH$_2$O ester, $^3$J 6.8 Hz), 4.24 (s, CH$_2$CO betaine glycine), 4.32 (s, CH$_2$CO ester), 5.30 (m, CH$_2$CH=CHCH$_2$ ester+CH$_2$CH=CHCH$_2$ alcohol).

| Method of treatment | Composition of the mixture | | | |
|---|---|---|---|---|
| | a | b | c | d |
| A | 48 | 36 | 14 | 2 | a, b, c and d are expressed as a percentage by mass.

The reactional raw material is chromatographed on a column of silica gel (ethyl acetate-isopropanol-water (6.2:3:0.8 then 6:3:1)) to give about 100 g of 9-octadecenyl betaine mesylate.

CH$_3$SO$_3^\ominus$ (CH$_3$)$_3$N$^\oplus$—\—O—\—\—CH$_3$
          ||         4      3
          O C$_{24}$H$_{49}$NO$_5$S; M=463.72 g/mol
Yellow viscous oil; yield: ≅85%
CCM: Rf 0.4 (ethyl acetate-isopropanol-water (6:3:1))
IR (Nujol) ν (cm$^{-1}$): 1755 (C=O); 1650 (C=C)
RMN $^{-1}$H (CDCl$_3$):
δ 0.83 (t, 3H, CH$_3$, $^3$J 6.8 Hz), 1.22 (sl, 22H, CH$_3$(CH$_2$)$_6$CH$_2$CH=CH CH$_2$(CH$_2$)$_5$CH$_2$CH$_2$O), 1.64 (m, 2H, CH$_2$CH$_2$O), 1.94 (m, 4H, CH$_2$CH=CHCH$_2$), 2.71 (s, 3H, CH$_3$SO$_3^-$), 3.30 (s, 9H, (CH$_3$)$_3$), 4.19 (t, 2H, CH$_2$CH$_2$O, $^3$J 6.8 Hz), 4.32 (s, 2H, CH$_2$CO), 5.31 (m, 2H, CH$_2$CH=CHCH$_2$).
RMN $^{13}$C (CDCl$_3$):
δ 14.21 (CH$_3$), 22.90, 25.89, 27.40, 28.49, 29.38, 29.52, 29.62, 29.73, 29.86, 29.91, 29.96, 32.13, 32.81 (CH$_2$ aliph.), 39.27 (CH$_3$SO$_3^-$), 54.09 ((CH$_3$)$_3$), 63.22 (CH$_2$CH$_2$O), 67.09 (CH$_2$CO), 129.93, 130.24 (CH$_2$CH=CHCH$_2$), 164.88 (CH$_2$CO).

EXAMPLE 3

Synthesis of betainylaminooctadecane mesylate and Preparation of a Corresponding Mixture A suspension of betaine glycine (25 g, 0.213 mole) in n-butanol (59 ml, 0.64 mole) was formed in the presence of methanesulphonic acid (22.56 g, 0.235 mole). The reactional mixture is brought to the reflux point of n-butanol at 140° C. The medium becomes homogeneous at the end of 3 to 4 hours' stirring. To the mixture cooled to ambient temperature is added dibutylamine (8.27 g, 0.064 mole) and the medium is stirred for about 15 minutes. Octadecylamine is then added (69 g, 0.256 mole), then the n-butanol is eliminated under reduced pressure. Aminolysis is carried out at 130° C. under reduced pressure (50 to 100 mbar). After 3 hours, the medium is cooled to ambient temperature. The reaction raw material obtained is washed with diethyl ether (1600 ml) until complete recovery of the residue. The precipitate obtained is then filtered on a Büchner and rinsed several times with the same solvent (2 □.200 ml). The product is dried in a vacuum and 98 g of a white powder having a surfactant composition according to the invention is eventually obtained.

RMN $^1$H of the mixture obtained (CDCL$_3$+CD$_3$OD, 1/1):

δ 0.90 (t, CH$_3$ amide+CH$_3$ amine salt, $^3$J 6.7 Hz), 1.29 (sl, (CH$_2$)$_{15}$CH$_3$ amide+(CH$_2$)$_{15}$CH$_3$ amine salt), 1.56 (m, CH$_2$CH$_2$NH amide), 1.67 (m, CH$_2$CH$_2$NH$_3^+$ amine salt), 2.78 (s, CH$_3$SO$_3^-$ amide+CH$_3$SO$_3^-$ amine salt+CH$_3$SO$_3^-$ betaine glycine), 2.91 (m, CH$_2$CH$_2$NH$_3^+$ amine salt), 3.26 (m, CH$_2$CH$_2$NH amide), 3.30 (s, (CH$_3$)$_3$ betaine glycine), 3.35 (s, (CH$_3$)$_3$ amide), 3.82 (s, CH$_2$CO betaine glycine), 4.10 (s, CH$_2$CO amide).

| Method of treatment | Composition of the mixture | | | |
|---|---|---|---|---|
| | e | f | g | h |
| B | 58 | 35 | 0 | 10 | e, f, g and h are expressed as a percentage by mass of the mixture.

The product obtained by the method of treatment B is chromatographed on a column of silica gel (ethyl acetate-isopropanol-water (6:3:1 then 5:3:2) to give about 58 g betainylaminooctadecane mesylate.

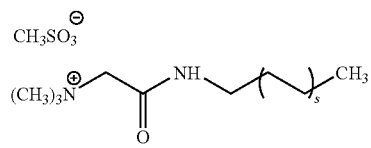

C$_{24}$H$_{52}$N$_2$O$_4$S; M=464.75 g/mol

White solid; yield: ≅60%

CCM: Rf 0.5 (ethyl acetate-isopropanol-water (5:3:2))

IR (Nujol) ν (cm$^{-1}$): 1680 (Amide I); 1578 (Amide II)

RMN $^1$H (DMSO):

δ 0.86 (t, 3H, CH$_3$, $^3$J 6.8 Hz), 1.25 (sl, 30H, (CH$_2$)$_{15}$CH$_3$), 1.45 (m, 2H, CH$_2$CH$_2$NH), 2.37 (s, 3H, CH$_3$SO$_3^-$), 3.10 (m, 2H, CH$_2$CH$_2$NH), 3.21 (s, 9H, (CH$_3$)$_3$, 4.05 (s, 2H, CH$_2$CO), 8.64 (s, 1H, NH).

RMN $^{13}$C (DMSO):

δ 13.40 (CH$_3$) 21.63, 24.22, 26.01, 28.27, 28.59, 30.88 (CH$_2$ aliph.), 38.50, (CH$_2$NH), 39.42 (CH$_3$SO$_3^-$), 53.35 ((CH$_3$)$_3$), 64.24 (CH$_2$CO), 162.66 (CH$_2$CO).

EXAMPLE 4

Synthesis of betainylaminooctadecenyl mesylate and Preparation of the Corresponding Mixture A suspension of betaine glycine (25 g, 0.213 mole) in n-butanol (59 ml, 0.64 mole) was formed in the presence of methanesulphonic acid (22.56 g, 0.235 mole). The reactional mixture is brought to the reflux point of n-butanol at 140° C. The medium becomes homogeneous at the end of 3 to 4 hours' stirring. To the mixture cooled to ambient temperature is added oleic amine (68.5 g, 0.256 mole), then the n-butanol is eliminated under reduced pressure. Aminolysis is carried out at 130-140° C. under reduced pressure (50 to 100 mbar). After 3 hours, the medium is cooled to ambient temperature. The reactional raw material obtained (114 g) forms a surfactant composition according to the invention.

RMN $^1$H of the reactional raw material (CDCl$_3$):

δ 0.86 (t, CH$_3$ amide+CH$_3$ amine salt+CH$_3$ amine, $^3$J 6.7 Hz), 1.29 (sl, CH$_3$(CH$_2$)$_6$CH$_2$CH=CHCH$_2$ (CH$_2$)$_5$CH$_2$CH$_2$N amide+amine salt+amine+CH$_2$CH$_2$NH$_2$ amine), 1.52 (m, CH$_2$CH$_2$NH amide), 1.61 (m, CH$_2$CH$_2$NH$_3^+$ amine salt), 1.98 (m, CH$_2$CH=CHCH$_2$ amide+amine salt+amine), 2.67 (t, CH$_2$CH$_2$NH$_2$ amine, $^3$J 6.8 Hz), 2.73 (s, CH$_3$SO$_3^-$ amide+CH$_3$SO$_3^-$ amine salt+ CH$_3$SO$_3^-$ betaine glycine), 2.87 (m, CH$_2$CH$_2$NH$_3^+$ amine salt), 3.21 (m, CH$_2$CH$_2$NH amide), 3.27 (s, (CH$_3$)$_3$ betaine glycine), 3.31 (s, (CH$_3$)$_3$ amide), 3.77 (s, CH$_2$CO betaine glycine), 4.08 (s, CH$_2$CO amide), 5.30 (m, CH$_2$CH=CHCH$_2$ amide+amine salt+amine).

| Method of treatment | Composition of the mixture | | | |
|---|---|---|---|---|
| | e | f | g | h |
| A | 56 | 31 | 8 | 5 | e, f, g and h are expressed as a percentage by mass of the mixture.

The reactional raw material is chromatographed on a column of silica gel (ethyl acetate-isopropanol-water (6:3:1 then 5:3:2)) in order to give about 64 g of betainylaminooctadecenyl mesylate.

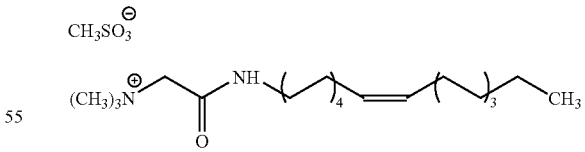

C$_{24}$H$_{50}$N$_2$O$_4$S; M=462.74 g/mol

White solid; yield: ≅65%

CCM: Rf 0.52 (ethyl acetate-isopropanol-water (5:3:2))

IR (Nujol) ν (cm$^{-1}$): 1678 (Amide I); 1576 (Amide II) 1640 (C=C)

RMN $^1$H (DMSO):

δ 0.84 (t, 3H, CH$_3$, $^3$J 6.7 Hz), 1.23 (sl 22H, CH$_3$ (CH$_2$)$_6$CH$_2$CH=CHCH$_2$(CH$_2$)$_5$CH$_2$CH$_2$NH), 1.40 (m, 2H, CH$_2$CH$_2$NH), 1.97 (m, 4H, CH$_2$CH=CHCH$_2$), 2.33 (s, 3H, $CH_3SO_3^-$), 3.08 (m, 2H, $CH_2\underline{CH}_2NH$), 3.20 (s, 9H, $(CH_3)_3$), 4.07 (s, 2H, $CH_2CO$), 5.31 (m, 2H, $\underline{CH}_2CH=CHCH_2$), 8.61 (s, 1H, NH).

RMN $^{13}C$ (DMSO):

δ 14.08 ($CH_3$), 22.20, 26.43, 26.65, 26.69, 28.69, 28.73, 28.80, 28.92, 29.96, 29.17. 29.22, 31.38, 32.04 ($CH_2$ aliph.), 38.66 ($CH_2NH$), 39.78 ($CH_3SO_3^-$), 53.25 (($CH_3)_3$), 63.86 ($\underline{CH}_2CO$), 129.74, 129.75 ($\underline{CH}_2CH=\underline{C}HCH_2$), 163.19 ($CH_2\underline{C}O$).

The physico-chemical properties of certain derivatives according to the invention are given below.

Measurement of Surface Tension and Critical Micellar Concentrations

The tensiometric measurements were carried out with a drop tensiometer operating by the method of the rising drop (TRACKER tensiometer, I.T. CONCEPT).

| Amphiphilic compounds | γcmc (mN/m) | CMC (M) |
|---|---|---|
| Esters | | |
| $C_{18:0}$ | 37.2 | $8 \cdot 10^{-4}$ |
| Amides | | |
| $C_{18:0}$ | 36.0 | $1.4 \cdot 10^{-4}$ |

| Amphiphilic compounds | γcmc (mN/m) | CMC (M) |
|---|---|---|
| Examples of widely used surfactants | | |
| APG ($C_{12}$) | 33.0 | $2.6 \cdot 10^{-4}$ |
| SDS ($C_{12}$) | 30.0 | $8 \cdot 10^{-3}$ |

Stability of Fatty Esters of the betaine glycine in an Aqueous Medium

The stability of octadecyl betaine mesylate is observed in an aqueous buffer solution whose pH-value is fixed to various values between 3 and 9. The initial concentration of surfactant in the buffer samples is $3.4 \cdot 10^{-2}$ Mole/l. The fatty alcohol released during the hydrolysis reaction is extracted by diethyl ether. After each extraction, the samples are centrifuged (10,000 rpm, 10 minutes) to "break" the emulsions formed. The etherised solution is then analysed by chromatography in a gaseous phase on an apolar column AT1 (polydimethylsiloxane) by using the n-dodecanol as an internal standard. The conditions applied are the following: injector at 320° C., detector at 330° C. and temperature gradient in the furnace; 200° C. (3 min.), 30° C./min (4 min.), 320° C. (5 min.). The only drawing shows the results obtained.

The comparative table below gives examples of formulae for aqueous bitumen emulsions according to the invention and results of tests obtained with these formulae by comparison with a control formula.

COMPARATIVE TABLE

| | A | B | C | D | E | F | G | Control |
|---|---|---|---|---|---|---|---|---|
| Formulae: | | | | | | | | |
| Bitumen % | 65.00 | 65.00 | 65.00 | 65.00 | 65.00 | 65.00 | 65.00 | 65.00 |
| AT1 % | 0.36 | | | | | | | |
| AT2 % | | 0.25 | | | | | | |
| AT3 % | | | | | 0.52 | | | |
| AT4 % | | | 0.25 | | | | | |
| AT5 % | | | | | | 0.43 | | |
| AT6 % | | | | | | | 0.45 | |
| HCl % | 0.05 | 0.05 | 0.05 | 0.05 | 0.05 | 0.05 | 0.03 | 0.13 |
| Water % | 34.59 | 34.70 | 34.70 | 34.50 | 34.43 | 34.52 | 34.52 | 34.59 |
| Results: | | | | | | | | |
| Rupture index | 40 | 61 | 44 | 59 | 60 | 58 | 48 | 76 |
| Adhesiveness | | | | | | | | |
| $1^{st}$ part | 75 | 100 | 90 | 100 | 100 | 100 | 100 | 90 |
| $2^{nd}$ part | 75 | 100 | 90 | 100 | 100 | 100 | 100 | 90 |
| Median diameter | 24.3 | 7.5 | 19.9 | 3.8 | 9.8 | 5.4 | 3.5 | 5.9 |
| pH aqueous phase | 2.2 | 2.3 | 2.4 | 2.6 | 1.7 | 2.6 | 3.4 | 2.6 |
| pH emulsion | 2.5 | 3.1 | 2.9 | 2.9 | 2.0 | 2.8 | 3.5 | |
| Stability 7j % | 18.8 | 0.8 | 4.0 | 1.1 | 2.9 | 0.0 | 6.1 | 6.5 |
| Binder content % | 72.2 | 65.5 | 67.1 | 65.5 | 67.5 | 66.0 | 66.2 | 68 |
| Filter residue % | 0.01 | 0.17 | 0.09 | 0.03 | 0.05 | 0.08 | 0.01 | 0 |
| Particles % | 0.17 | 0.16 | 0.11 | 0.13 | 0.09 | 0.09 | 0.03 | 0 |
| Pseudoviscosity % | 12 | 52 | 55 | 33 | 17 | 103 | 71 | 9 |
| Water content % | 34.8 | 34.7 | 35.0 | 35.0 | 35.0 | 34.7 | 34.5 | 35.4 |

In the table above, the products indicated in the formulae have the following meanings:
Bitumen: 160/220 BP Lavera
AT1: octadecyl betaine mesylate at 72%
AT2: octadecenyl betaine mesylate at 100% (purified product)
AT3: octadecenyl betaine mesylate at 48%
AT4: betainylaminooctadecane mesylate at 100% (purified product)
AT5: betainylaminooctadecane mesylate at 58%
AT6: betainylaminooctadecenyl mesylate at 58%

The methods of carrying out the tests carried out on the emulsions are as follows:

For the rupture index: NF EN 13075-1

For adhesiveness: NFT 66-018. These are emulsions with a limited shelf life on 6/10 Diorites de la Meilleraie fine gravel, washed and dried. The $1^{st}$ part of the test is carried out at ambient temperature, and the $2^{nd}$ part of the test at 60° C.

The median diameter is determined by means of a laser granulometer of the type Coulter LS 100. It is expressed in micrometres. It is a mode of operation belonging to the Applicant.

The measures of pH (for the aqueous phase and the emulsion) were carried out according to a mode of operation belonging to the Applicant.

Stability at 7 days, expressed in %, was determined by a mode of operation belonging to the Applicant.

The screen residues, expressed in %, were determined with a screen with a mesh size of 0.50 mm in accordance with NF EN 1429.

The particles are those of between 0.50 mm and 0.16 mm.

The water content was determined according to NF EN 1428.

The pseudoviscosity, expressed in s, was measured at 25° C. with a nozzle of 4 mm according to NFT 66-020.

A typical aqueous bitumen emulsion according to the invention generally comprises about 30 to 80% by weight bitumen, about 20 to 70% water and at least 2% by weight surfactant agent.

Preferred values are as follows: 60 to 70% by weight bitumen, 30 to 40% by weight water and at least 1% by weight surfactant agent.

The emulsion may comprise other components, in particular an acid, more particularly hydrochloric acid, in a proportion of less than 0.25% by weight.

The preparation of the emulsion is carried out by simple mixing of its components. The surfactant is dissolved in the water prior to emulsification. The same applies to the other additives such as the acids or water-soluble polymers.

The bitumen used may be pure or modified by the addition of polymers. It may, however, be fluxed (addition of a substance capable of fluidising this bitumen) or not.

Mixing with strong shearing forces, e.g. by means of a mill, turbine or static mixer, makes it possible to obtain the aqueous bitumen emulsion desired.

The bitumen emulsion according to the invention is used mainly for the preparation of road coverings by mixing with appropriate aggregates, such as fine gravel etc.

In the case of a surface coating, the emulsion will be spread over the road surface in the form of a film by means of a lorry specially adapted for the pulverisation of controlled quantities of emulsion. Directly afterwards, the aggregates are spread in turn. The rupture of the emulsion permits the evacuation of water but also renders the road surface impermeable and generates adhesion of the aggregates. These will make it possible to restore a roughness to the surface which helps to generate good adhesion of the motor vehicles to the road.

The application of emulsion/aggregates may also be effected by means of a mixer with the addition or otherwise of additives for optimising the quality of coating as well as the rupture rate of the emulsion. This is then referred to as coated materials in emulsion.

EXAMPLE 5

Formation of a Coated Material

Used alone, octadecyl betaine mesylate (MBO) leads to emulsions which are more useful for spreading. On the other hand, it is possible to use this in combination with a water-soluble polymer of the polyvinyl alcohol (PVOH) type in order to stabilise the bitumen emulsion. A compromise in formulation makes it possible to adjust the rupture index to a sufficient value to obtain good coating whilst controlling the rupture rate due to the presence of MBO.

It is thus possible to manufacture the following emulsion:

| | |
|---|---|
| bitumen 5070 | 60% |
| MBO | 0.44% |
| PVOH | 0.7% |
| HCl | 0.05% |
| $H_2O$ | 38.81% |

This emulsion has the following properties:

| | |
|---|---|
| pH | 2.0 |
| median diameter Laser LS 100 (mm) | 2.2 |
| rupture index | 140 |
| residue on 0.5 mm screen (%) | 0.54 |
| particles between 0.5 and 0.16 mm (%) | 0.02 |

With this formulation, it was possible to coat a 0/6 formulation of Delage aggregates:

| | |
|---|---|
| 0/2 | 35 |
| 6/10 | 30 |
| 0.4 | 17.5 |
| 4/6 | 17.5 | perfectly with 8.8% emulsion, having a rupture rate which was satisfactory for application to a road surface.

The invention claimed is:

1. Aqueous bitumen emulsion containing bitumen and a surfactant agent, wherein the surfactant agent comprises at least one compound

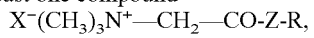

X being a sulphonate radical,

R being a monovalent radical $C_{2n}H_{2(2n-m)+1}$ containing 2n atoms of carbon and m double bonds, with $9 \leq n \leq 11$, $0 \leq m \leq 3$ if n=9 and $0 \leq m \leq 1$ if n>9, and Z being selected from the group consisting of an atom of oxygen and a —NH— group.

2. Emulsion according to claim 1, wherein the surfactant agent further comprises at least one compound selected from the group consisting of

RZH,

XH, and

each compound XH being combined if necessary with at least one compound $RNH_2$ in order to form at least one compound $X^-RN^+H_3$.

3. Emulsion according to claim 2, wherein the surfactant agent comprises virtually exclusively compounds selected from the group consisting of $X^-(CH_3)_3N^+$—$CH_2$—CO-Z-R,
RZH,
XH, and
$X^-(CH_3)_3N^+$—$CH_2$—CO—OH.

4. Emulsion according to either claim 2 or claim 3, wherein m=0 and the compounds forming the surfactant agent are as follows, in the percentages by weight indicated:

| | |
|---|---|
| $X^-(CH_3)_3N^+$—$CH_2$—CO—O—R | 50 ± 10 |
| ROH | 19 ± 10 |
| XH | 23 ± 10 |
| $X^-(CH_3)_3N^+$—$CH_2$—CO—OH | 0 to 18. |

5. Emulsion according to either claim 2 or claim 3, wherein m=0 and the compounds forming the surfactant agent are the following, in the percentages by weight indicated:

| | |
|---|---|
| $X^-(CH_3)_3N^+$—$CH_2$—CO—O—R | 72 ± 10 |
| ROH | 0 to 20 |
| XH | 0 to 18 |
| $X^-(CH_3)_3N^+$—$CH_2$—CO—OH | 0 to 20. |

6. Emulsion according to either claim 2 or claim 3, wherein m=0 and the compounds forming the surfactant agent are the following, in the percentages by weight indicated:

| | |
|---|---|
| $X^-(CH_3)_3N^+$—$CH_2$—CO—O—R | 80 ± 10 |
| ROH | 20 ± 10. |

7. Emulsion according to either claim 2 or claim 3, wherein m=0 and the compounds forming the surfactant agent are the following, in the percentages by weight indicated:

| | |
|---|---|
| $X^-(CH_3)_3N^+$—$CH_2$—CO—O—R | 70 ± 10 |
| ROH | 26 ± 10 |
| XH | 0 to 14. |

8. Emulsion according to either claim 2 or claim 3, wherein m>0 and the compounds forming the surfactant agent are the following, in the percentages by weight indicated:

| | |
|---|---|
| $X^-(CH_3)_3N^+$—$CH_2$—CO—O—R | 48 ± 10 |
| ROH | 36 ± 10 |
| XH | 14 ± 10 |
| $X^-(CH_3)_3N^+$—$CH_2$—CO—OH | 0 to 12. |

9. Emulsion according to either claim 2 or claim 3, wherein m=0 and the compounds forming the surfactant agent are the following, in the percentages by weight indicated:

| | |
|---|---|
| $X^-(CH_3)_3N^+$—$CH_2$—CO—NH—R | 58 ± 10 |
| $X^-RN^+H_3$ | 35 ± 10 |
| $X^-(CH_3)_3N^+$—$CH_2$—CO—OH | 0 to 20. |

10. Emulsion according to either claim 2 or claim 3, wherein m>0 and the compounds forming the surfactant agent are the following, in the percentages by weight indicated:

| | |
|---|---|
| $X^-(CH_3)_3N^+$—$CH_2$—CO—NH—R | 56 ± 10 |
| $X^-RN^+H_3$ | 31 ± 10 |
| $RNH_2$ | 0 to 18 |
| $X^-(CH_3)_3N^+$—$CH_2$—CO—OH | 0 to 15. |

11. Emulsion according to claim 1, wherein X is selected from the group consisting of methanesulphonate, paratoluenesulphonate and camphosulphonate.

12. Emulsion according to claim 1, comprising about 30 to 80% by weight bitumen, about 20 to 70% by weight water and at least 2% by weight of the surfactant agent.

13. Emulsion according to claim 12, further comprising an acid in a proportion of less than 0.25% by weight of the emulsion.

14. Emulsion according to either claim 12 or claim 13, further comprising a water-soluble polymer in a proportion of 0.1 to 2% by weight of the emulsion.

15. Emulsion according to claim 1, comprising about 60 to 70% by weight bitumen, 30 to 40% by weight water and at least 1% by weight of the surfactant agent.

16. Emulsion according to claim 13, wherein the acid is hydrochloric acid.

17. Emulsion according to claim 14, wherein the water-soluble polymer is polyvinyl alcohol.

18. A method of using an aqueous bitumen emulsion, the method comprising coating a surface with the emulsion of claim 1.

* * * * *